United States Patent
Schwarzkopf et al.

(10) Patent No.: US 10,391,838 B2
(45) Date of Patent: Aug. 27, 2019

(54) RETURN AIR BLOCKING DEVICE FOR VENTILATION OF THE INTERIOR OF A MOTOR VEHICLE

(71) Applicant: ILLINOIS TOOL WORKS INC., Glenview, IL (US)

(72) Inventors: Nikolaus Schwarzkopf, Wolfsburg (DE); Marco Spanier, Braunschweig (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 541 days.

(21) Appl. No.: 14/379,562

(22) PCT Filed: Feb. 14, 2013

(86) PCT No.: PCT/US2013/026080
§ 371 (c)(1),
(2) Date: Aug. 19, 2014

(87) PCT Pub. No.: WO2013/126265
PCT Pub. Date: Aug. 29, 2013

(65) Prior Publication Data
US 2015/0165873 A1    Jun. 18, 2015

(30) Foreign Application Priority Data
Feb. 21, 2012    (DE) .................. 10 2012 003 258

(51) Int. Cl.
*B60H 1/24* (2006.01)
*F16K 15/03* (2006.01)

(52) U.S. Cl.
CPC ........... *B60H 1/249* (2013.01); *F16K 15/031* (2013.01); *F16K 15/035* (2013.01)

(58) Field of Classification Search
CPC ...... B60H 1/249; F16K 15/031; F16K 15/035
(Continued)

(56) References Cited

U.S. PATENT DOCUMENTS 5,263,895 A * 11/1993 Kraus .................... B60H 1/249
137/855
5,601,117 A *  2/1997 Lewis .................... B60H 1/249
137/527.8
(Continued)

FOREIGN PATENT DOCUMENTS

CN        101522449 A    9/2009
DE    202006020365 U1    7/2008
(Continued)

OTHER PUBLICATIONS

ISR and WO for PCT/US2013/026080 mailed May 10, 2013.

*Primary Examiner* — Steven B McAllister
*Assistant Examiner* — Frances F. Hamilton
(74) *Attorney, Agent, or Firm* — Pilloff & Passino LLP; Martin J. Cosenza

(57) ABSTRACT

A return air blocking device for ventilation of the interior of a motor vehicle, with a frame or housing with at least one sealing surface and with at least one flexible valve flap mounted on the frame or the housing, which in an idle position abuts on the sealing surface and prevents a flow of air through the return air blocking device, and which, when a sufficient pressure occurs, assumes an opening position lifted from the sealing surface in which it allows a flow of air through the return air blocking device, wherein the at least one valve flap comprises at least one slit on its end mounted on the frame or housing, wherein the frame or the housing comprises at least one holding projection which engages in the at least one slit.

26 Claims, 1 Drawing Sheet

Figure 1:
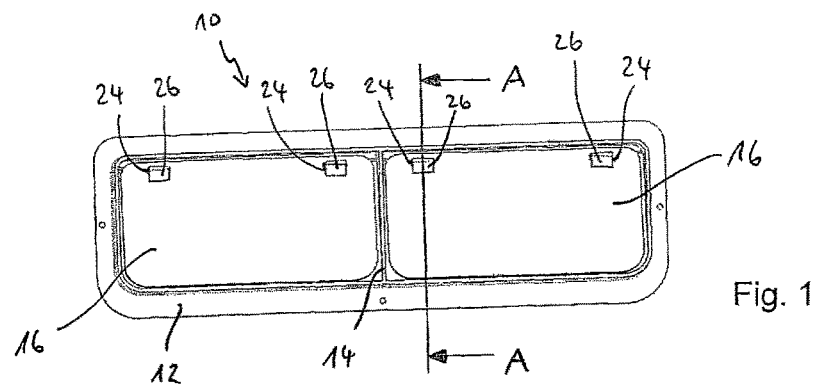

(58) Field of Classification Search
USPC .......................................................... 454/70
See application file for complete search history.

(56) References Cited

U.S. PATENT DOCUMENTS

| | | | | |
|---|---|---|---|---|
| 5,904,618 | A * | 5/1999 | Lewis | B29C 45/1676 |
| | | | | 137/855 |
| 6,132,308 | A * | 10/2000 | Dietz | B29C 45/0081 |
| | | | | 454/162 |
| 6,837,784 | B2 * | 1/2005 | Omiya | B60H 1/249 |
| | | | | 137/512.1 |
| 7,044,164 | B2 * | 5/2006 | Carlson | B60H 1/249 |
| | | | | 137/315.33 |
| 8,955,542 | B2 * | 2/2015 | Kiezulas | B60H 1/249 |
| | | | | 137/512 |
| 8,986,086 | B2 * | 3/2015 | Carlson | B60H 1/249 |
| | | | | 292/1 |
| 2009/0075580 | A1 * | 3/2009 | Mootz | B60H 1/249 |
| | | | | 454/162 |
| 2009/0280736 | A1 * | 11/2009 | Schneider | B60H 1/249 |
| | | | | 454/162 |
| 2010/0120346 | A1 | 5/2010 | Jansen | |
| 2010/0291854 | A1 * | 11/2010 | Carlson | B60H 1/249 |
| | | | | 454/162 |
| 2011/0041930 | A1 * | 2/2011 | Kiezulas | B60H 1/249 |
| | | | | 137/527 |
| 2011/0230129 | A1 * | 9/2011 | Weber | B60H 1/249 |
| | | | | 454/162 |

FOREIGN PATENT DOCUMENTS

| | | | | |
|---|---|---|---|---|
| EP | 0728606 A1 | 8/1996 | | |
| EP | 0915302 A2 * | 5/1999 | | B29C 47/0019 |

* cited by examiner

RETURN AIR BLOCKING DEVICE FOR VENTILATION OF THE INTERIOR OF A MOTOR VEHICLE

RELATED APPLICATIONS

The present application is a National Phase of International Application Number PCT/US2013/026080 filed Feb. 14, 2013, which claims priority to German Application Number 102012003258.7 filed Feb. 21, 2012.

The invention concerns a return air blocking device for ventilation of the interior of a motor vehicle, with a frame or housing with at least one sealing surface and with at least one flexible valve flap mounted on the frame or the housing, which in an idle position abuts on the sealing surface and prevents a flow of air through the return air blocking device, and which when a sufficient pressure occurs, assumes an opening position lifted from the sealing surface in which it allows a flow of air through the return air blocking device, wherein the at least one valve flap comprises at least one slit on its end mounted on the frame or housing, wherein the frame or the housing comprises at least one holding projection which engages in the at least one slit, and wherein, in its idle position, the at least one valve flap lies at its end mounted on the frame or the housing on at least one first supporting surface and at its opposite end on at least one second supporting surface which is approximately parallel to the at least one first supporting surface.

Such return air blocking devices are fitted in openings in the body of a motor vehicle. If in the vehicle interior a positive pressure predominates in comparison with the environment of the motor vehicle, valve flaps of the return air blocking device open so that air can flow out of the vehicle interior to reduce the positive pressure. In the opposite flow direction, the valve flaps block. A return air blocking device to ventilate the interior of a motor vehicle is known for example from DE 20 2006 020 365 U1. This return air blocking device has valve flaps made of a closed pore, foamed material which pivot out of their idle position into the opening position. It is also known to attach valve flaps flexibly with one edge to the housing of a return air blocking device.

The known return air blocking devices require substantial construction space for complete opening of the valve flap. In many applications however there is insufficient construction space available for opening the valve flaps. A certain size of valve flaps is however necessary for adequate ventilation function. At the same time, for compatibility reasons in particular with regard to installation in body openings, it is desirable not to change the frame size of the ventilation blocking devices.

Starting from the outlined prior art, the invention is based on the object of providing a return air blocking device of the type cited initially which guarantees an adequate ventilation function at all times, with lower requirements for construction space.

The invention achieves this object with the subject of claim 1. Advantageous embodiments are given in the secondary claims, the description and the figures.

For a return air blocking device of the type cited initially, the invention achieves the object in that the at least one holding projection comprises a stop surface, wherein the at least one valve flap is held at its end mounted on the frame or housing between the stop surface and the first supporting surface such that it cannot substantially pivot into the opening position but can only assume the opening position through bending, and the stop surface, starting from the end mounted on the frame or the housing, extends over a part of the surface of the at least one valve flap in the direction of the opposite end so that, when the at least one valve flap assumes the opening position, at least a segment of the valve flap covered by the stop surface does not substantially bend.

The return air blocking device according to the invention is mounted in an opening in the body of a motor vehicle. For this the return air blocking device, on the outside of its housing or on its frame, can have a sealing lip which guarantees a sealed installation. In fitted state the return air block is oriented so that when a positive pressure predominates in the vehicle interior in comparison with the region outside the vehicle, the at least one valve flap moves out of its idle position into its opening position so that air can flow outward from the vehicle interior through the return air blocking device to diminish the positive pressure. If however the pressure in the vehicle interior is lower than that outside the vehicle, the at least one valve flap moves into its idle position so that substantially no air can flow from the outside into the vehicle interior. The at least one valve flap can here be formed such that on a pressure equilibrium between the vehicle interior and the region outside the vehicle, it moves into its idle position for example under its own weight.

According to the invention, the at least one valve flap is mounted between the at least one stop surface and the at least one first supporting surface such that it must bend to reach the opening position. Pivoting of the valve flap is substantially completely prevented by the stop surface of the holding projection which extends over part of the length of the valve flap. The stop surface extends in the longitudinal direction of the at least one valve flap over a part of the surface of the at least one valve flap. The longitudinal direction of the at least one valve flap extends from the end of the valve flap mounted on the frame to its opposite free end. When the valve flap bends, the segment covered by the stop surface therefore does not substantially bend. On movement of the at least one valve flap according to the invention from its idle position to its opening position, the valve flap is therefore bent up about an edge defined by the stop surface of the holding projection which has a defined distance from the respective side edge of the at least one valve flap. As directly evident, this leads to a reduced space requirement for the at least one valve flap in its opening position. The space required by the return air blocking device according to the invention is therefore reduced. Thus the return air blocking device according to the invention can also be used in applications in which only a reduced construction space is available for the return air blocking device or for opening the valve flap.

At the same time according to the invention there is an adequate flow of air to reduce the positive pressure in the vehicle interior. For this, the size of the valve flaps, in particular their length, need not be changed in relation to known valve flaps. Also the dimensions of the frame or housing of the return air blocking device need not be changed compared with known return air blocking devices. Thus the return air blocking device according to the invention is completely compatible with former return air blocking devices, so no adaptations are required to the vehicle bodywork, in particular with regard to the openings provided for the return air blocking devices.

The at least one valve flap can in particular have several slits, for example two or three. Then correspondingly several holding projections, for example two or three, formed in the manner according to the invention can be formed on the housing or frame of the return air blocking device. Each of the holding projections then comprises a stop surface formed in the manner according to the invention. Correspondingly the frame or housing then comprises several first and second supporting surfaces formed in the manner of the invention, on which the at least one valve flap abuts in its idle position. Accordingly the at least one valve flap in the region of its end mounted on the frame or housing is then held between several stop surfaces and several first supporting surfaces in the manner according to the invention. The return air blocking device can in addition comprise several valve flaps formed in the manner according to the invention, for example two, four or six valve flaps. The statements above then apply to each of the valve flaps.

By suitable choice of the length of the at least one valve flap covered by the stop surface, the space required by the valve flap in the opening position can be set in a targeted manner and thus adapted to the respective application. It is particularly suitable in this respect if the segment of the at least one valve flap which does not substantially bend, starting from the end mounted on the frame or housing, in the direction of the opposite free end, has a length of at least 5%, preferably at least 10% of the overall length of the at least one valve flap in this direction.

According to a further embodiment it can be provided that the at least one holding projection has a triangular form in cross section, wherein the holding projection is guided with a first corner side through the at least one slit of the at least one valve flap, wherein the leg side opposite the first corner side forms the stop surface with its underside facing away from the first corner side. Such a triangular form firstly allows simple assembly, in particular by machine from above, in that the triangle is first introduced with its first corner side into the slit of the valve flap. The leg side of the triangle facing away from this corner side forms the stop surface with its underside, so the limitation of construction space according to the invention is achieved particularly simply. On insertion of the holding projection, the slit is expanded and when the holding projection is fully guided through the slit, it snaps back below the stop surface so that the valve flap is held securely on the housing or frame via the holding projection(s). The holding projection can for example have a hollow triangular form. Here the at least one holding projection in particular has an extension transverse to the at least one slit of the at least one valve flap, which is greater than the width of the slit.

According to a particularly practical embodiment, the at least one first supporting surface for the at least one valve flap can be formed by a lug on the housing or frame. Furthermore the stop surface of the at least one holding projection can run substantially parallel to the at least one first supporting surface. The distance between the at least one stop surface and the at least one first supporting surface can substantially be the same or only slightly greater than the thickness of the at least one valve flap. In this way pivoting of the at least one valve flap is prevented particularly reliably. Insofar as the distance provided between the at least one stop surface and the at least one first supporting surface is greater than the thickness of the valve flap, this can shift between its idle position and its opening position slightly in the flow direction of the air before it bends into the opening position.

The at least one valve flap can be made of a plastic or rubber material. The frame or housing of the return air blocking device can for example consist of a plastic. The frame or the housing can be made of a harder material than the at least one valve flap. The use of plastic materials allows the production of the return air blocking device according to the invention in a particularly simple manner in a plastic injection molding process. Where applicable seals provided on the frame or housing of the return air blocking device, such as a sealing surface for the at least one valve flap or a sealing lip mounted on the outside to seal against the bodywork, can also be made of plastic and for example be applied in a multi-component injection molding process wherein first the frame or housing and then the corresponding seals are molded. A suitable plastic for the valve flaps is for example PET. It is however also possible to make the valve flaps from a closed pore, foamed material. This leads to particularly low noise on closing and opening of the valve flaps.

Figure 2:
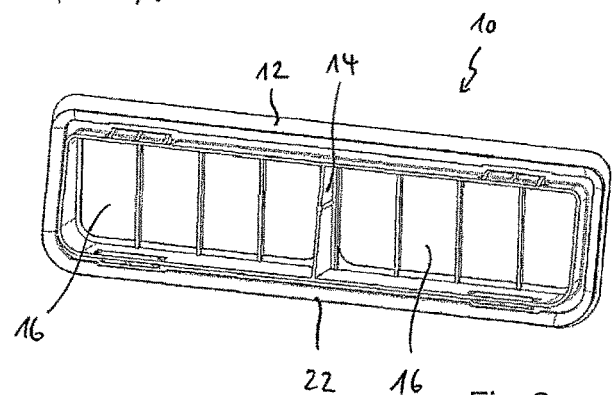
Figure 3:
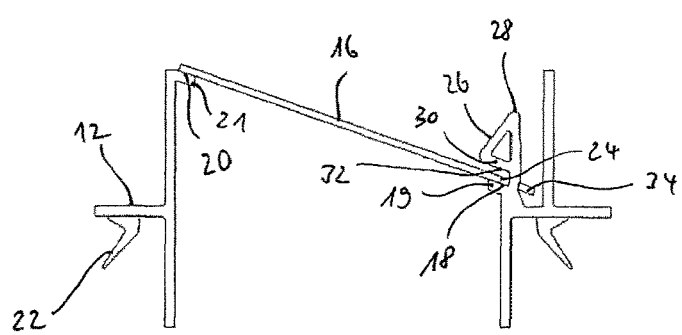
Figure 4:
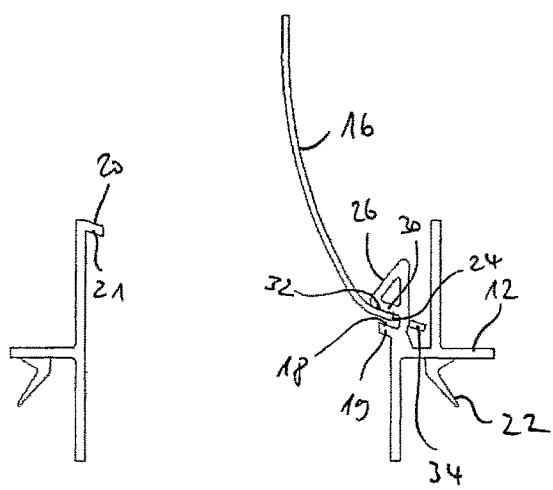

An embodiment example of the invention is explained below in more detail with reference to the figures. The drawings show diagrammatically:

FIG. 1 a return air blocking device according to the invention in a view from the front;

FIG. 2 the return air blocking device of FIG. 1 in a view from the rear;

FIG. 3 a section view along line A-A in FIG. 1 in a first operating position of the return air blocking device, and FIG. 4 the section view from FIG. 3 in a second operating position of the return air blocking device.

Unless specified otherwise, in the figures the same reference numerals indicate the same objects. FIGS. 1 and 2 show a return air blocking device 10 according to the invention in view from the front and rear. The return air blocking device 10 consists of a frame 12 which has an approximately rectangular form and is divided into two halves by a longitudinal web 14. In particular the frame 12 with the web 14 forms two rectangular openings, in each of which is arranged a valve flap 16. The valve flaps 16 are mounted at their one end, the upper end in FIG. 1, on the frame 12. FIGS. 1 to 3 show the idle position of the valve flap 16. FIG. 3 shows that the valve flaps 16 in this state each lie with their end mounted on the frame 12 on a first supporting surface 18 and at their opposite end on a second supporting surface 20. The first and second supporting surfaces 18, 20 are each formed by a lug 19, 21 on the frame 12. For example it is clear from FIGS. 1 and 2 that the valve flaps 16 in their idle position also at their two further sides abut on suitable supporting surfaces of the frame 12. The supporting surfaces 18, 20 and the further supporting surfaces of the frame 12 are formed as sealing surfaces so that the valve flaps 16, in the idle position shown in FIGS. 1 to 3, substantially completely prevent the flow of air through the rectangular openings of the frame 12. In operation the return air blocking device 10 with the frame 12 is inserted in an opening (not shown) provided therefor in the body of a motor vehicle (not shown). The return air blocking device is inserted such that the back of the return air blocking device 10 shown in FIG. 2 faces the vehicle interior, and the front of the return air blocking device 10 shown in FIG. 1 is allocated to a region outside the vehicle interior. In particular in FIGS. 3 and 4, a peripheral sealing lip 22 can be seen which here guarantees a sealed installation.

In the example shown, the frame 12 can be made for example of a relatively hard plastic in a plastic injection molding process. The sealing surfaces for the valve flaps 16 and sealing lip 22 can be made of a softer plastic material and for example be molded onto the frame 12 in a multi-component injection molding process. The valve flaps 16 can also be made of a softer plastic than the frame 12. In particular they can be made from a closed pore, foamed plastic. It is however also conceivable that the valve flaps 16 for example consist of a rubber material. In any case the valve flaps 16 are comparatively thin and hence very flexible.

The valve flaps 16 therefore each also have, at their end mounted on the frame 12, two slits 24 through which is guided a holding projection 26 of the frame 12 which is triangular in cross section, in particular formed as a hollow triangle. The valve flaps 16 are mounted by machine from above in the view in FIG. 3, in that first the holding projection 26 with its corner side 28 at the top in FIG. 3 is pressed through the slit 24. Thus the slit 24 widens and then engages under the holding projection 26 by snapping back under reformation. The leg side 30 opposite the corner side 28 with its underside forms a stop surface 32 for the respective valve flap 16. The stop surface 32 extends substantially parallel to the first supporting surface 18. It is evident in FIG. 3 in particular that the valve flap 16 is held between the first supporting surface 18 and the stop surface 32, wherein a short end segment 34 of the valve flap 16 protrudes beyond the holding projection 26. It is further evident in FIG. 3 that the distance between the first supporting surface 18 and the stop surface 32 is slightly greater than the thickness of the valve flap 16. The stop surface 32, starting from the end of the valve flap 16 mounted on the frame 12, in the direction of the opposite end which in its idle position abuts on the second supporting surface 20, extends over a part of the surface of the at least one valve flap 16. In particular the stop surface 32 can extend in this longitudinal direction of the valve flap 16, which runs from top to bottom in FIG. 1, over a length of at least 5%, preferably at least 10% of the overall length of the valve flap 16 in this direction.

If now, in the fitted state of the return air blocking device 10, a positive pressure predominates in the vehicle interior in comparison with the environment, an upward pressure in FIG. 3 acts on the valve flaps 16. The valve flaps 16 under this pressure move out of their idle position shown in FIGS. 1 to 3 into their opening position shown in FIG. 4. It is evident that the valve flaps 16 are bent to reach their opening position, as pivoting is largely prevented by the mounting of the valve flaps 16. Here a segment in the region of the end of the valve flap 16 mounted on the frame 12 is not however bent. In particular the valve flaps 16 are bent about an edge formed by the limit of the stop surface 32 on the left in FIG. 4. The region of the valve flaps 16 on the right thereof in FIG. 4 is not bent. In the state shown in FIG. 4, air can flow outward from the vehicle interior, from bottom to top in FIG. 4. As soon as the pressure between the vehicle interior and the environment has balanced, the valve flaps 16 close automatically under their own weight, i.e. they return to the idle position shown in FIG. 3, wherein the bend also straightens. In relation to a valve flap pivoting in the conventional manner, as shown in the prior art according to DE 20 2006 020 365 U1, less space is required for the valve flaps 16 to assume their opening position. In particular the free end of the valve flaps 16 does not move so far up in the opening position shown in FIG. 4. The amount of construction space required can be adapted to the respective application in a defined manner by suitable choice of geometry of the stop surfaces 32 of the holding projections 26. Other dimensions of the return air blocking device 10, in particular the frame 12 or valve flaps 16, need not be changed so that the return air blocking device 10 can be installed compatibly with conventional return air blocking devices.

The invention claimed is:

1. Return air blocking device for ventilation of the interior of a motor vehicle, the return air blocking device comprising:
   a frame or housing; and
   at least one flexible valve flap mounted on the frame or the housing,
   wherein, in an idle position, the valve flap closes and blocks a flow of air through the return air blocking device, and wherein, when a sufficient pressure occurs, the valve flap assumes an opening position, in which it allows a flow of air through the return air blocking device, wherein the at least one valve flap comprises at least one slit on its end mounted on the frame or housing, wherein the frame or the housing comprises at least one holding projection, which engages in the at least one slit via initial widening of the slit and then subsequent reformation under the holding projection, and wherein, in its idle position, the at least one valve flap lies on at least one first bearing surface on its end mounted on the frame or the housing and on at least one second bearing surface on its opposing end, wherein the at least one second bearing surface is parallel to the at least one first bearing surface, wherein
   the at least one holding projection comprises a stop surface, wherein the at least one vale flap is held on its end mounted on the frame or housing between the stop surface and the first bearing surface such that it can not pivot into the opening position, but only can reach the opening position through bending, and
   the stop surface, starting from the end mounted on the frame or the housing extends over a part of a surface of the at least one valve flap in the direction of the opposing end, so that upon assuming the opening position by the at least one valve flap, at least a section of the at least one valve flap being covered by the stop surface does not bend.

2. Return air blocking device according to claim 1, wherein the section which does not bend, starting from the end of the at least one valve flap mounted on the frame or housing in the direction of its opposing end, has a length of at least 5%, preferably at least 10%, of the overall length of the at least one valve flap in this direction.

3. Return air blocking device according to claim 1, wherein the at least one holding projection comprises a triangular form in cross-section, wherein the holding projection is guided with a first corner side through the at least one slit of the at least one valve flap, wherein a leg side being opposite to the first corner side forms the stop surface with its underside facing away from the first corner side.

4. Return air blocking device according to claim 1, wherein the at least one holding projection has an extension transverse to the at least one slit of the at least one valve flap, which is larger than the width of the slit.

5. Return air blocking device according to claim 1, wherein the at least one first bearing surface for the at least one valve flap is formed by a lug on the housing or frame.

6. Return air blocking device according to claim 1, wherein the stop surface of the at least one holding projection runs parallel to the at least one first bearing surface.

7. Return air blocking device according to claim 1, wherein the at least one valve flap consists of a plastic material or of a rubber material.

8. Return air blocking device according to claim 1, wherein the frame or the housing consists of a plastic material.

9. Return air blocking device according to claim 1, wherein the frame or the housing consists of a harder material than the at least one valve flap.

10. Return air blocking device according to claim 1, wherein when the at least one flap is open, a portion of the at least one flap includes a surface that is parallel to the stop surface.

11. Return air blocking device according to claim 1, wherein the stop surface is located on an inboard side of the at least one holding projection, and wherein, when the at least one flap is in direct contact with the stop surface, an outboard portion, relative to the at least one holding projection, of the at least one flap is free of contact with structure of the return air blocking device.

12. Return air blocking device according to claim 1, wherein the device is configured to enable the at least one valve flap to move as a unit in a direction parallel to a direction of airflow in the return air blocking device prior to reaching the stop surface.

13. Return air blocking device according to claim 1, wherein the holding projection is triangular in cross section.

14. Return air blocking device according to claim 1, wherein the first bearing surface is parallel to the stop surface.

15. Return air blocking device according to claim 1, wherein the first bearing surface is parallel to the stop surface, and the second bearing surface is on the same plane as the first bearing surface.

16. Return air blocking device according to claim 1, wherein the device is configured to enable the at least one valve flap to move as a unit in a direction perpendicular to a direction of airflow in the return air blocking device prior to reaching the stop surface.

17. Return air blocking device according to claim 1, wherein the first bearing surface faces the stop surface, and the first bearing surface and the stop surface are the same distance from each other over a region in which the first bearing surface and the stop surface face each other.

18. Return air blocking device according to claim 1, wherein the first bearing surface faces the stop surface, and the first and the second bearing surfaces and the stop surface lie on respective planes that are normal to a plane that is normal to the first bearing surface.

19. Return air blocking device according to claim 1, wherein the second bearing surface is on the same plane as the first bearing surface.

20. Return air blocking device according to claim 1, wherein the distance between the first bearing surface and the stop surface is greater than the thickness of the valve flap.

21. Return air blocking device for ventilation of the interior of a motor vehicle, the return air blocking device comprising:
a frame or housing with at least one sealing surface; and
a flexible valve flap mounted on the frame or the housing,
wherein, in an idle position, the valve flap abuts on the sealing surface and blocks a flow of air through the return air blocking device,
wherein, when a sufficient pressure occurs, the valve flap assumes an opening position in which the valve flap is entirely lifted from the sealing surface, and in which the valve flap allows a flow of air through the return air blocking device,
wherein the valve flap comprises a slit on a first end mounted on the frame or housing,
wherein the frame or the housing comprises a holding projection, which engages in the slit via initial widening of the slit and then subsequent reformation under the holding projection,
wherein, in the idle position, the valve flap lies on a first bearing surface on the first end mounted on the frame or the housing, and on a second bearing surface on a second end opposing the first end,
wherein at least one of the second bearing surface or the first bearing surface define the at least one sealing surface, and
wherein
the holding projection comprises a stop surface, wherein the valve flap is held on the first end mounted on the frame or housing between the stop surface and the first bearing surface, and
the stop surface extends over a part of the valve flap in a direction from the first end toward the second end of the valve flap, so that upon assuming the opening position by the valve flap,
a first section of the valve flap, including the first end, is lifted off the first bearing surface and comes in contact with the stop surface, while remaining parallel to the first bearing surface,
a second section of the valve flap, including the second end, is lifted off the second bearing surface and is bent, about an end of the stop surface, relative to the first section, and
wherein the distance between the first bearing surface and the stop surface is greater than the thickness of the valve flap.

22. Return air blocking device for ventilation of the interior of a motor vehicle, the return air blocking device comprising:
a frame or housing with at least one sealing surface; and
at least one flexible valve flap made of plastic or rubber material mounted on the frame or the housing,
wherein, in an idle position, the valve flap abuts on the sealing surface and blocks a flow of air through the return air blocking device, and wherein, when a sufficient pressure occurs, the valve flap assumes an opening position lifted from the sealing surface, in which it allows a flow of air through the return air blocking device, wherein the at least one valve flap comprises at least one slit on its end mounted on the frame or housing, wherein the frame or the housing comprises at least one holding projection, which engages in the at least one slit, and wherein, in its idle position, the at least one valve flap lies on at least one first sealing surface of the at least one sealing surface on its end mounted on the frame or the housing and on at least one second sealing surface of the at least one sealing surface on its opposing end, wherein the at least one second sealing surface is parallel to the at least one first sealing surface, wherein
the at least one holding projection comprises a stop surface, wherein the at least one valve flap is held on its end mounted on the frame or housing between the stop surface and the first sealing surface such that it does not pivot into the opening position, but only can reach the opening position through bending, and
the stop surface, starting from the end mounted on the frame or the housing extends over a part of a surface of the at least one valve flap in the direction of the opposing end, so that upon assuming the opening position by the at least one valve flap, at least a section of the at least one valve flap being covered by the stop surface is undeflected.

23. Return air blocking device according to claim 22, wherein all portions of the flexible valve flap on the side of the flexible valve flap facing the direction of the air flow that moves the flap from the idle position are away from contact with any other part of the device.

24. Return air blocking device according to claim 22, wherein the flexible valve flap bends in a curved manner in the opening position over at least all of the area away from the first sealing surface.

25. Return air blocking device according to claim 22, wherein the device is configured such that all parts of the flexible valve flap move to a higher location, relative to a direction of air flow, upon reaching the opening position relative to the idle position.

26. Return air blocking device according to claim 22, wherein the first sealing surface is parallel to the stop surface.

* * * * *